United States Patent [19]

Pianalto

[11] 4,352,504
[45] Oct. 5, 1982

[54] REAR BRAKE HOLDER FOR BICYCLES

[75] Inventor: Adriano Pianalto, Vicentino, Italy

[73] Assignee: Gipiemme s.r.l., Camisano Vicentino, Italy

[21] Appl. No.: 144,586

[22] Filed: Apr. 28, 1980

[30] Foreign Application Priority Data

May 3, 1979 [IT] Italy .............................. 64269/79[U]
Jun. 7, 1979 [IT] Italy .............................. 64283/79[U]

[51] Int. Cl.³ .............................................. B62K 19/38
[52] U.S. Cl. .............................. 280/281 R; 188/24.22; 280/288
[58] Field of Search .......................... 280/281 R, 288; 188/24.12, 24.13, 24.14, 24.15, 24.16, 24.17, 24.18, 24.19, 24.20, 24.21, 24.22

[56] References Cited

U.S. PATENT DOCUMENTS 4,055,235 10/1977 Tanaka .......................... 188/24.14

FOREIGN PATENT DOCUMENTS 420844 12/1934 United Kingdom ............. 188/24.22
675533 7/1952 United Kingdom ............. 188/24.22

*Primary Examiner*—John A. Pekar
*Attorney, Agent, or Firm*—Bucknam and Archer

[57] ABSTRACT

An integral monolithic strut for the rear brake of bicycles is described which comprises a one piece structure having a central portion of cubic shape through which an opening is caved out for the passage of the bolt which serves as support for the brake, the central portion extending in two lateral portions which have the shape of a truncated cone. The opening is sufficient to permit the complete insertion of a threaded bushing which has a handle bolt for fixing the screw which emerges from the body of the brake. The diameter of the opening is slightly greater than the diameter of the bushing, and the difference between the two diameters is sufficient for the insertion of a toothed disc which permits a perfect blocking of the body of the brake while the bushing is entirely fixed in the interior of the strut.

2 Claims, 3 Drawing Figures

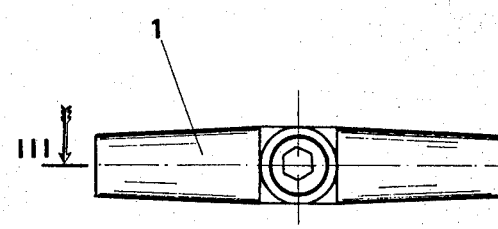
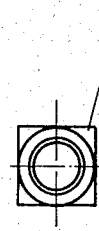
FIG.1　　　　FIG.2
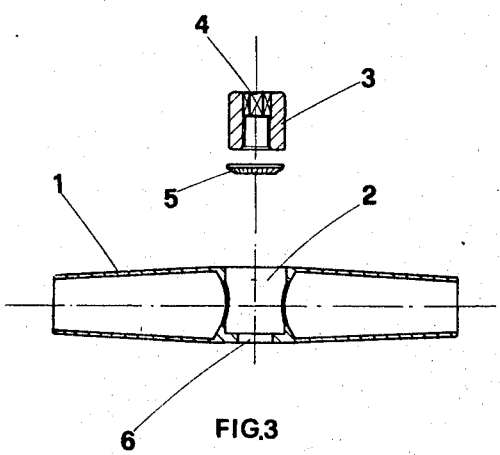
FIG.3

REAR BRAKE HOLDER FOR BICYCLES

SUMMARY OF INVENTION

The present invention relates to a strut for the rear brake of bicycles. More specifically, the present invention covers a strut for the brake of a bicycle in which one of the novel features resides in the fact that the bush of the passage of the bolt which serves as the support for the brake is caved out in the strut monolithically, that is in one piece, so that the necessity of soldering of the bush on the same strut is eliminated.

According to another feature of the present invention, a special threaded bushing is used provided with a handle device which is entirely inserted within an opening made in the strut for the purpose of fixing the rear brake of the bicycle to the frame. In this manner, the brake is perfectly fixed on the frame at the bottom of the opening made in the strut by interposing between the bushing and the bottom of the opening a toothed disc, which prevents the disassembly or the parts from becoming loose while at the same time, the advantage of the absence of every external structure is avoided.

As it is well-known, the rear struts to be applied to the frame of the bicycle for the support of the brake are provided with a biconical body within which an opening is caved out for the passage of the screw which supports the brake. In the devices known in the art, the support and fixing of the brake are never perfectly stable, a fact which, particularly when the bicycle is in operation, may create serious problems if the bicycles are used in races.

By using the device according to the present invention on the other hand, the strut comprises a central structure of prismatic shape through which an opening is caved out for fixing the screw which supports the brake, a fact which makes the position of the latter much more stable, and an obvious advantage from the point of view of safety during operation of the bicycle.

According to another novel feature of the invention, the opening is provided with a portion of greater diameter within which the special threaded bushing is inserted, which bushing is provided with a handle device which permits to achieve a perfect blocking of the brake in the strut. Between the bushing and the bottom of the opening there is inserted a toothed disc, which prevents the disassembly and prevents the parts from becoming loose while at the same time, the advantage of the absence of every external structure is avoided.

BRIEF DESCRIPTION OF THE DRAWING VIEWS

The device according to the present invention is illustrated in the accompanying drawing of which:

FIG. 1 is a front view of the entire device with the bushing inserted in the opening;

FIG. 2 is a side view of the same device;

FIG. 3 is an exploded sectional view taken along the line III—III of FIG. 1.

DESCRIPTION OF A PREFERRED EMBODIMENT OF THE INVENTION

The strut of the present invention comprises a body 1 of biconical shape with a central cylindrical portion within which there is caved out the opening 2. Within the opening 2 there is placed the bushing 3 which is provided with a handle bolt 4. Further, the toothed disc 5 is interposed in the opening and specifically is placed at the bottom of the opening 2 between the external diameter of the latter and the diameter of the opening 6 through which there is passed the screw which holds the body of the brake. The relatively greater surface of support which is arranged at the bottom of opening 2, permits by means of the insertion of the toothed disc 5 to achieve a perfect holding and blocking of the body of the brake to the strut while the bushing 3 is entirely located in the interior of the opening 2.

The advantages resulting from the use of the strut of the present invention are obvious because the present invention permits to achieve a definite fixing and blocking of the body of the brake, while keeping the feature of a total absence of the external structures ordinarily used for the blockage, structures which may be nuts or similar structures which ordinarily emerge from the strut and which ordinarily interfere with the strut particularly when the bicycle is used in a race.

What is claimed is:

1. In a strut for the brake of a bicycle, the combination which comprises an integral body including a hollow central portion and a pair of hollow, lateral portions connected each to said central portion is oppositely extending relation; and a threaded bushing completely received in an opening of said central portion, said bushing being disposed to receive a threaded bolt extending into said opening to support said brake.

2. The combination according to claim 3 including a toothed disc disposed in said opening of the central portion of said integral body and received against said threaded bushing to stabilize same therein.

* * * * *